United States Patent
Kiehl et al.

(10) Patent No.: US 7,144,040 B2
(45) Date of Patent: Dec. 5, 2006

(54) BI-METALLIC STRUCTURAL COMPONENT FOR VEHICLE FRAME ASSEMBLY

(75) Inventors: Mark W. Kiehl, Bernville, PA (US); Robert D. Durand, Reading, PA (US)

(73) Assignee: Dana Corporation, Toledo, OH (US)

( * ) Notice: Subject to any disclaimer, the term of this patent is extended or adjusted under 35 U.S.C. 154(b) by 220 days.

(21) Appl. No.: 10/389,233

(22) Filed: Mar. 14, 2003

(65) Prior Publication Data
US 2003/0214155 A1    Nov. 20, 2003

Related U.S. Application Data

(60) Provisional application No. 60/365,863, filed on Mar. 19, 2002.

(51) Int. Cl.
*B62D 21/02*    (2006.01)
(52) U.S. Cl. ............ 280/785; 280/796; 280/797; 280/800; 280/781; 296/205; 296/29
(58) Field of Classification Search ............ 280/785, 280/796, 797, 798, 800, 781; 296/204, 205, 296/29, 30
See application file for complete search history.

(56) References Cited

U.S. PATENT DOCUMENTS

| | | | |
|---|---|---|---|
| 1,846,567 A * | 2/1932 | Murray, Jr. ............ 280/796 |
| 2,107,382 A * | 2/1938 | Maddock ............ 280/796 |
| 2,113,403 A * | 4/1938 | Harmon ............ 280/796 |
| 2,914,641 A | 11/1959 | Yuhasz |
| 3,520,049 A | 7/1970 | Lysenko et al. |
| 3,528,596 A | 9/1970 | Carlson |
| 3,630,694 A * | 12/1971 | Enright et al. ............ 428/638 |
| 4,093,253 A * | 6/1978 | Lehr ............ 280/789 |
| 4,147,379 A * | 4/1979 | Winslow ............ 280/781 |
| 4,150,274 A * | 4/1979 | Minin et al. ............ 219/610 |
| 4,469,356 A | 9/1984 | Duret et al. |
| 4,513,188 A | 4/1985 | Katzenstein |
| 4,585,247 A * | 4/1986 | Takada ............ 280/281.1 |
| 4,663,819 A | 5/1987 | Traylor |

(Continued)

FOREIGN PATENT DOCUMENTS

DE    19538803    4/1996

(Continued)

*Primary Examiner*—Paul N. Dickson
*Assistant Examiner*—George D. Spisich
(74) *Attorney, Agent, or Firm*—MacMillan, Sobanski & Todd, LLC (57) ABSTRACT

A vehicle body and frame assembly includes a pair of longitudinally extending side rails having a plurality of transverse cross members extending therebetween. The cross member is a multiple piece structure, including a central portion having a pair of end portions secured thereto. The central portion of the cross member is preferably formed from a first metallic material, while the end portions are preferably both formed from a second metallic material. The end portions of the cross member are preferably formed from the same metallic material as the respective side rails to which they are secured. The end portions of the cross member can be secured to the ends of the central portion by any desired process, such as by magnetic pulse welding. Similarly, the cross member can be secured to the side rails by any desired process, such as by magnetic pulse welding or by conventional welding. The end portions of the cross member can extend either partially or completely through the respective side rails. If desired, a reinforcing and positioning collar can be secured to the end portions of the cross member adjacent to each of the side rails.

16 Claims, 5 Drawing Sheets

U.S. PATENT DOCUMENTS

| | | | |
|---|---|---|---|
| 4,807,351 A | | 2/1989 | Berg et al. |
| 5,131,714 A | | 7/1992 | Evans, Sr. et al. |
| 5,474,331 A | | 12/1995 | Booher |
| 5,609,004 A | | 3/1997 | Kreis |
| 5,613,794 A | * | 3/1997 | Isaac et al. ................ 403/265 |
| 5,634,663 A | * | 6/1997 | Krupp et al. ............... 280/800 |
| 5,655,792 A | | 8/1997 | Booher |
| 5,720,511 A | * | 2/1998 | Benedyk ................ 296/203.01 |
| 5,848,469 A | | 12/1998 | O'Conner et al. |
| 5,865,362 A | * | 2/1999 | Behrmann et al. ....... 228/114.5 |
| 5,947,519 A | * | 9/1999 | Aloe et al. ................ 280/785 |
| 5,966,813 A | * | 10/1999 | Durand ..................... 29/897.2 |
| 5,981,921 A | * | 11/1999 | Yablochnikov ............ 219/603 |
| 6,148,581 A | * | 11/2000 | Separautzki ............... 52/653.2 |
| 6,234,375 B1 | | 5/2001 | Durand |
| 6,250,679 B1 | * | 6/2001 | Schnell ...................... 280/800 |
| 6,255,631 B1 | * | 7/2001 | Kichline et al. ........... 219/617 |
| 6,412,818 B1 | * | 7/2002 | Marando .................... 280/781 |
| 6,523,876 B1 | * | 2/2003 | Durand ..................... 296/35.1 |
| 6,568,745 B1 | * | 5/2003 | Kosuge et al. ............. 296/204 |
| 6,813,818 B1 | * | 11/2004 | Schmidt .................... 29/419.2 |
| 6,921,444 B1 | * | 7/2005 | Joaquin et al. ............ 148/570 |
| 2005/0035586 A1 | * | 2/2005 | Martin et al. .............. 280/781 |

FOREIGN PATENT DOCUMENTS

| | | | |
|---|---|---|---|
| DE | 19842718 | | 3/2000 |
| JP | 7080570 | | 3/1995 |
| JP | 10338161 | | 12/1998 |
| JP | 2001-1939 | * | 1/2001 |
| WO | 01/08843 | | 2/2001 |

* cited by examiner

BI-METALLIC STRUCTURAL COMPONENT FOR VEHICLE FRAME ASSEMBLY

CROSS REFERENCE TO RELATED APPLICATION

This application claims the benefit of U.S. Provisional Application No. 60/365,863, filed Mar. 19, 2002, the disclosure of which is incorporated herein by reference.

BACKGROUND OF THE INVENTION

This invention relates in general to body and frame assemblies for vehicles. In particular, this invention relates to an improved structure for a structural component for use in such a vehicle body and frame assembly.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

As mentioned above, each of these body and frame assemblies is composed of a plurality of individual structural components that are secured together. In the past, each of these structural components has been formed from a single piece of metallic material, and all of the structural components have been formed from the same metallic material. Steel has traditionally been the preferred metallic material for manufacturing all of such structural components because of its relatively high strength, relatively low cost, and ease of manufacture. Also, when all of the structural components are formed from the same or similar metallic materials, it is relatively easy to secure them together using conventional welding techniques, which usually involve the application of heat to localized areas of two metallic members so as to cause a coalescence of the two metallic members.

More recently, however, it has been found desirable to form some of the structural components from a first metallic material and others of the structural components from a second metallic material. For example, in a ladder frame type of vehicle frame assembly, the side rails can be formed from steel, while the cross members can be formed from aluminum or magnesium. The use of such alternative metallic materials to form some of the structural components is desirable because it can significantly reduce the overall weight of the vehicle body and frame assembly. Unfortunately, conventional welding techniques are not well suited for securing together components that are formed from dissimilar metallic materials. Magnetic pulse welding is a process that can be used to secure together the structural components that are formed from dissimilar metallic materials. Although magnetic pulse welding is an effective method for securing such structural components together in a manufacturing facility, it would be relatively difficult to perform such an operation elsewhere, such as in a small repair shop if a portion of the vehicle frame assembly was damaged and required replacement. Thus, it would be desirable to provide an improved structure for a structural component, such as for use in a vehicle body and frame assembly, that addresses both concerns of weight reduction and ease of securement.

SUMMARY OF THE INVENTION

This invention relates to an improved structure for a structural component for use in a vehicle body and frame assembly. The vehicle body and frame assembly can be a ladder frame assembly including a pair of longitudinally extending side rails having a plurality of transverse cross members extending therebetween. The cross member is a multiple piece structure, including a central portion having a pair of end portions secured thereto. The central portion of the cross member is preferably formed from a first metallic material, while the end portions are preferably both formed from a second metallic material. The end portions of the cross member are preferably formed from the same metallic material as the respective side rails to which they are secured. The end portions of the cross member can be secured to the ends of the central portion by any desired process, such as by magnetic pulse welding. Similarly, the end portions of the cross member can be secured to the side rails by any desired process, such as by magnetic pulse welding or by conventional welding. The end portions of the cross member can extend either partially or completely through the respective side rails. If desired, a reinforcing and positioning collar can be secured to the end portions of the cross member adjacent to each of the side rails.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
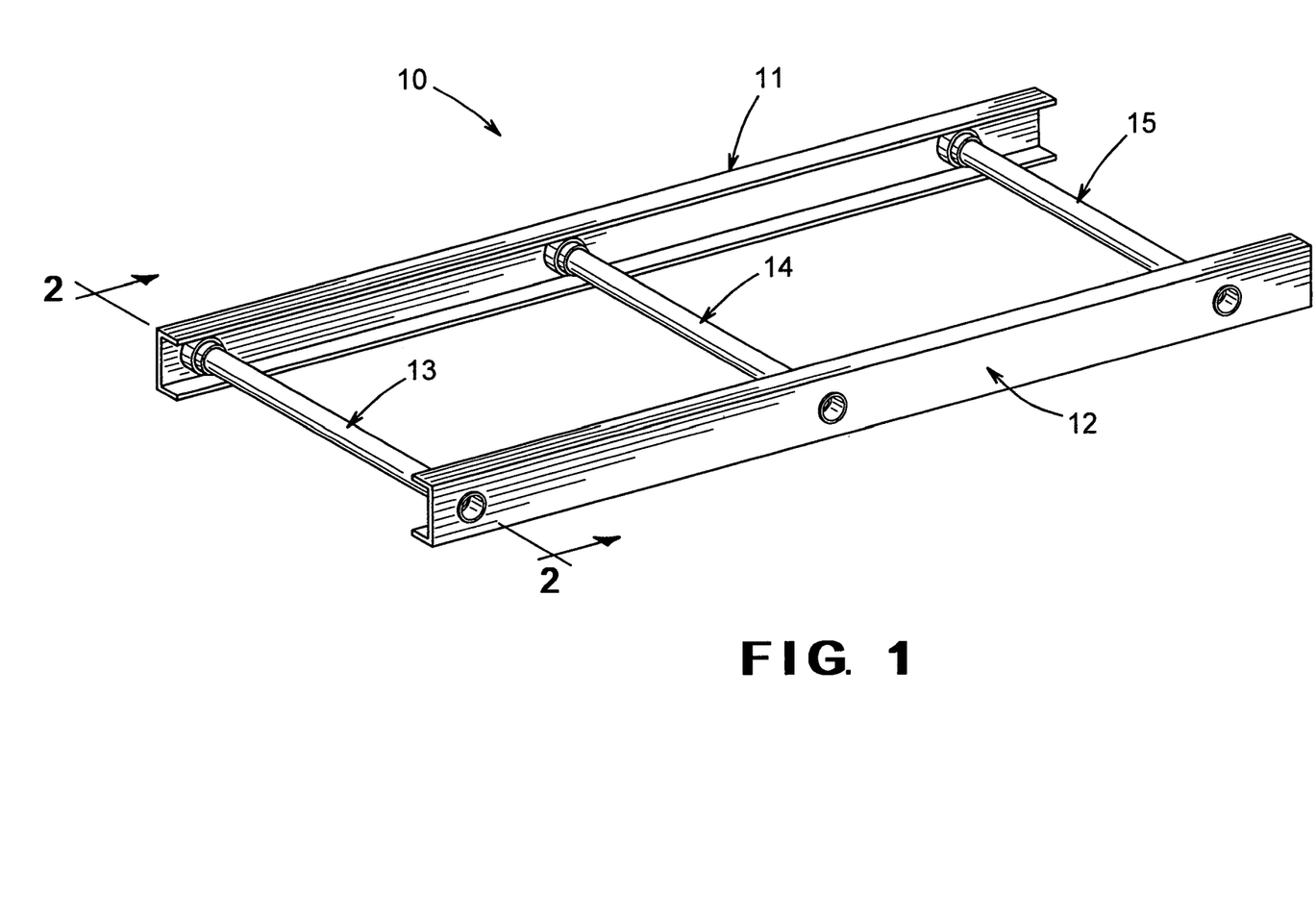
FIG. 1 is a schematic perspective view of a first embodiment of a vehicle body and frame assembly including a pair of side rails having a plurality of cross members manufactured in accordance with this invention extending therebetween.

Referring now to the drawings, there is illustrated in FIG. 1 a first embodiment of a vehicular body and frame assembly, indicated generally at 10, in accordance with this invention. The illustrated vehicular body and frame assembly 10 is a ladder frame type of vehicle frame assembly. However, it will be appreciated that the apparatus and method of this embodiment of the invention may be utilized in the manufacture of any type of vehicle body and frame assembly, such as a unitized type of body and frame assembly where the structural components of the body portion and the frame portion are combined into an integral unit, as discussed above. Additionally, as used herein, the term "vehicle frame assembly" is intended to include any type of vehicle structure, such as an upper body structure for use in or with a vehicle body and frame assembly.

The illustrated vehicular body and frame assembly 10 includes a pair of longitudinally extending side rails, indicated generally at 111 and 12, having a plurality of transverse cross members, indicated generally at 13, 14, and 15, extending therebetween. The side rails 11 and 12 extend longitudinally along the length of the assembly 10 and are generally parallel to one another. Each of the illustrated side rails 11 and 12 is formed from a single, unitary member that extends along the entire length of the assembly 10. However, it will be appreciated that the side rails 11 and 12 may extend for only a portion of the length of the frame assembly 10. Alternatively, either or both of the side rails 11 and 12 may be formed from two or more individual side rail sections that are welded or secured together in any manner to form the side rails 11 and 12. The illustrated side rails 11 and 12 are formed from open channel structural members having a cross sectional shape that is generally C-shaped. However, the side rails 11 and 12 may be formed having any desired cross sectional shape. Furthermore, as will become apparent below, the side rails 11 and 12 may alternatively be formed from closed channel structural members having any desired cross sectional shape. The side rails 11 and 12 may be formed from any desired material or group of materials.

The cross members 13, 14, and 15 extend generally perpendicular to the side rails 11 and 12. The cross members 13, 14, and 15 are spaced apart from one another along the length of the assembly 10. The ends of the cross members 13, 14, and 15 are secured to the side rails 11 and 12 at respective joints in a manner that will be described in detail below. When secured to the side rails 11 and 12, the cross members 13, 14, and 15 provide desired rigidity to the assembly 10. Although three cross members 13, 14, and 15 are shown in FIG. 1, it will be appreciated that a greater or lesser number of such cross members 13, 14, and 15 may be provided if desired. The illustrated cross members 13, 14, and 15 are formed from closed channel structural members having a generally circular cross sectional shape. However, the cross members 13, 14, and 15 may be formed having any desired cross sectional shape and may, if desired, be from open channel structural members.

Figure 2:
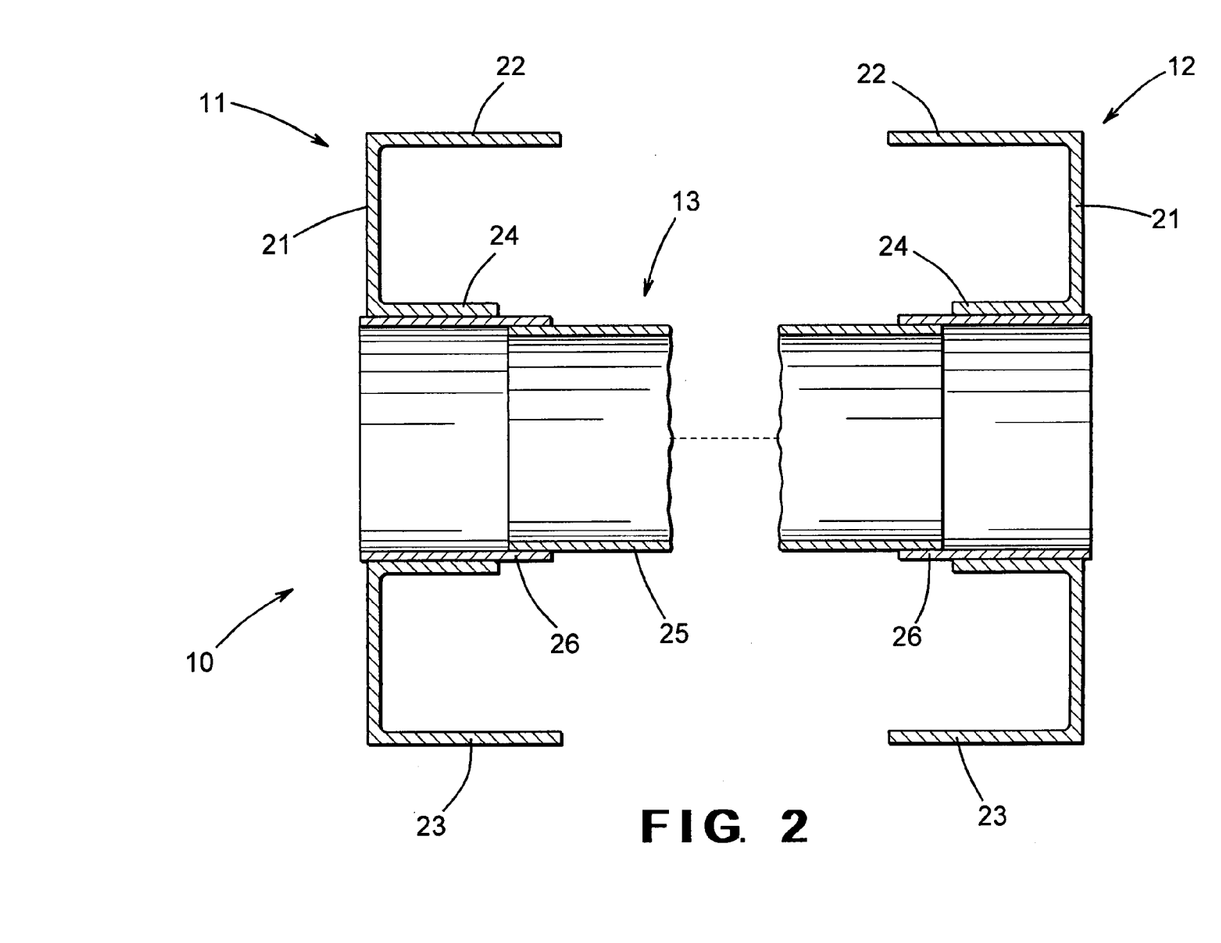
FIG. 2 is an enlarged sectional elevational view of portions of the two side rails and one of the cross members taken along line 2—2 of FIG. 1.

Referring now to FIG. 2, there is illustrated an enlarged sectional elevational view of portions of the two side rails 11 and 12 and one of the cross members 13 of the ladder frame assembly 10. The side rail 11 includes a central web 21 having upper and lower flanges 22 and 23 extending therefrom. A portion of the web 21 is deformed inwardly to define a mounting projection 24. In the illustrated embodiment, the mounting projection 24 is generally hollow and cylindrical in shape, corresponding to the generally cylindrical shape of the end of the cross member 13. However, it will be appreciated that the mounting projection 24 and the end of the cross member 13 may be formed having any desired shapes. The other side rail 12 is formed in a similar manner (although such is not required), and like reference numbers are used in FIG. 2 to indicate similar structures. As will be explained in greater detail below, the mounting projections 24 are sized to receive respective ends of the cross member 13 therein to form a joint between the cross member 13 and each of the side rails 11 and 12. Although this invention will be described and illustrated in the context of the multiple piece cross member 13 being secured to the side rails 11 and 12 of the illustrated ladder type vehicle frame assembly 10, it will be appreciated that this invention can be used to form any type of structural member for use in any type of vehicle frame assembly 10.

The illustrated cross member 13 (which is intended to be representative of any or all of the cross members 13, 14, and 15) is a multiple piece structure, including a central body portion 25 having a pair of end portions 26 secured thereto. In the illustrated embodiment, the central portion 25 is relatively long in comparison with the lengths of the end portions 26. For example, the illustrated central portion 25 of the cross member 13 extends most of the length thereof between the two side rails 11 and 12. However, this invention contemplates that the central portion 25 and each of the end portions 26 of the cross member 13 can have any desired relative lengths. The central portion 25 of the cross member 13 is preferably formed from a first metallic material, while the end portions 26 are preferably both formed from a second metallic material. Also, it is preferable that the end portions 26 of the cross member 33 be formed from the same metallic material as the respective side rails 11 and 12 to which they are secured. For example, if the side rails 11 and 12 of vehicle frame assembly 10 are formed from steel, then the end portions 26 of the cross member 13 can also be formed from steel, while the central portion 26 of the cross member 13 can be formed from aluminum or magnesium. However, it will be appreciated that the side rails 11 and 12, the central portion 25 of the cross member 13, and each of the end portions 26 of the cross member can be formed from any desired material or materials.

The end portions 26 of the cross member 13 can be secured to the ends of the central portion 25 by any desired process. For example, a magnetic pulse welding process can be used to secure the end portions 26 to the central portion 25 to form the cross member 13. This can be accomplished by initially orienting each of the ends of the central portion 25 in a co-axially overlapping relationship respectively with each of the end portions 26, leaving a predetermined annular clearance therebetween. Then, a conventional electrical inductor (not shown) is provided concentrically about or within the co-axially overlapping portions of the ends of the central portion 25 and the associated end portions 26. The inductor is energized in a known manner to generate a magnetic field that either collapses the outer member inwardly into engagement with the inner member or expands the inner member outwardly into engagement with the outer member. In either event, the high velocity impact of the ends of the central portion 25 with each of the end portions 26, as well as the large pressures exerted thereon, cause them to become permanently joined together to form the cross member 13.

Thereafter, the cross member 13 is secured to the side rails 11 and 12 by any desired process. For example, the same magnetic pulse welding process described above can be used to respectively secure the end portions 26 of the cross member 13 to the mounting portions 24 of the side rails 11 and 12. Alternatively, a conventional welding process can be used to secure the end portions 26 of the cross member 13 to the mounting portions 24 of the side rails 11 and 12. Such a conventional welding process (which, as described above, usually involves the application of heat to localized areas of the two metallic members so as to cause a coalescence of the two metallic members) would be most feasible when the end portions 26 of the cross member 13 are formed from the same or similar metallic materials as the side rails 11 and 12. Thus, it can be seen that the cross member 13 of this invention is well suited for use as an aftermarket product that can be connected to the side rails 11 and 12 using conventional welding techniques to repair the vehicle frame assembly 10.

Figure 3:
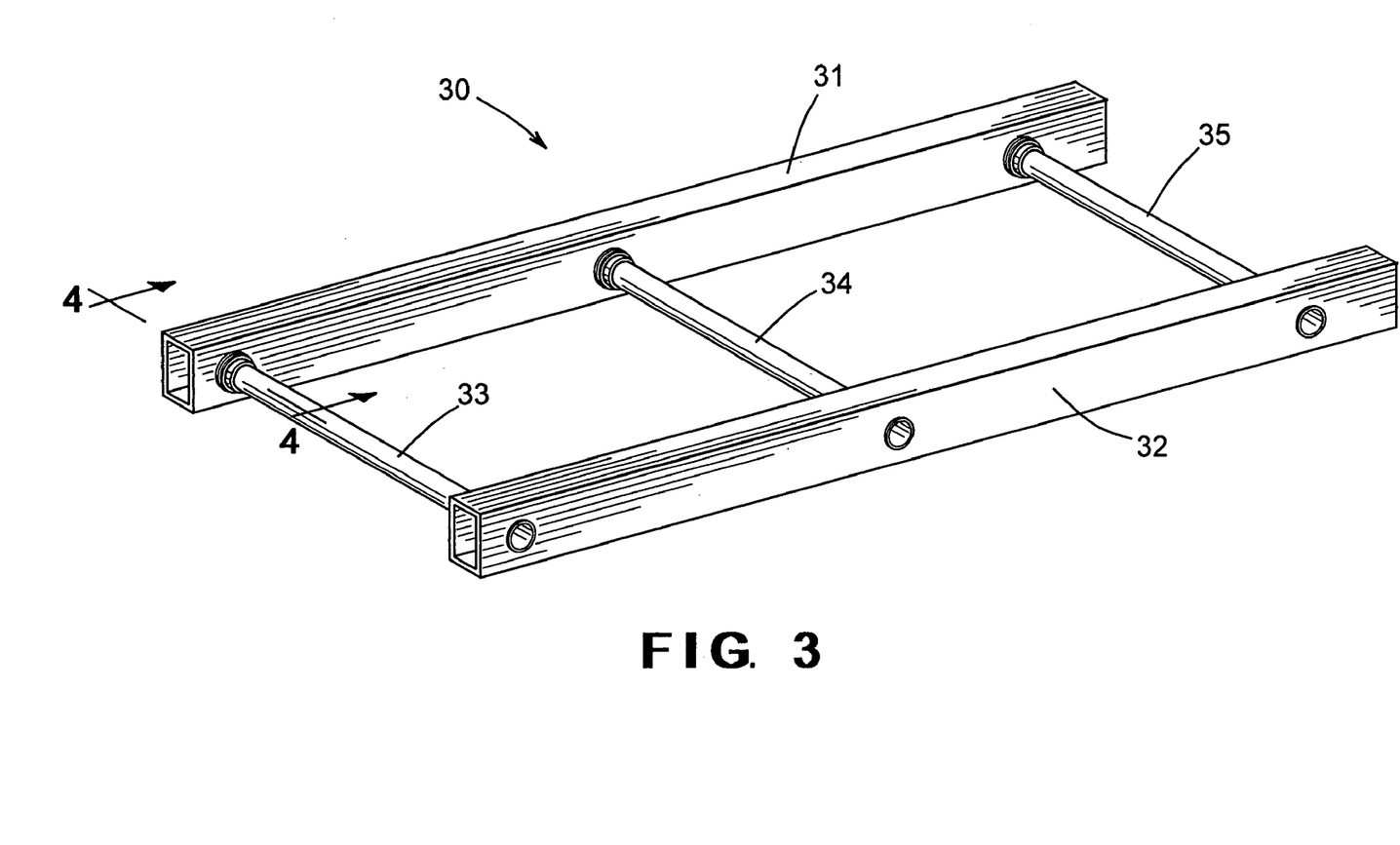
FIG. 3 is a schematic perspective view of a second embodiment of a vehicle body and frame assembly including a pair of side rails having a plurality of cross members manufactured in accordance with this invention extending therebetween.

Referring now to FIG. 3, there is schematically illustrated a second embodiment of a vehicle body and frame assembly, indicated generally at 30, that has been manufactured in accordance with the apparatus and method of this invention. The illustrated vehicle body and frame assembly 30 is also a ladder frame assembly. However, it will be appreciated that the apparatus and method of this embodiment of the invention may also be utilized in the manufacture of any type of vehicle body and frame assembly, such as a unitized body and frame assembly where the structural components of the body portion and the frame portion are combined into an integral unit, as discussed above.

The illustrated ladder frame assembly 30 includes a pair of longitudinally extending side rails, indicated generally at 31 and 32, having a plurality of transverse cross members, indicated generally at 33, 34, and 35, extending therebetween. The side rails 31 and 32 extend longitudinally along the length of the assembly 30 and are generally parallel to one another. Each of the illustrated side rails 31 and 32 is formed from a single, unitary member that extends along the entire length of the assembly 30. However, it will be appreciated that the side rails 31 and 32 may extend for only a portion of the length of the frame assembly 30. Alternatively, either or both of the side rails 31 and 32 may be formed from two or more individual side rail sections that are welded or secured together in any manner to form the side rails 31 and 32. The illustrated side rails 31 and 32 are formed from closed channel structural members having a cross sectional shape that is generally rectangular. However, the side rails 31 and 32 may be formed having any desired cross sectional shape. Furthermore, the side rails 31 and 32 may be formed from open channel structural members having any desired cross sectional shape. The side rails 31 and 32 may be formed from any desired material or group of materials.

The cross members 33, 34, and 35 extend generally perpendicular to the side rails 31 and 32. The cross members 33, 34, and 35 are spaced apart from one another along the length of the assembly 30. The ends of the cross members 33, 34, and 35 are secured to the side rails 31 and 32 at respective joints in a manner that will be described in detail below. When secured to the side rails 31 and 32, the cross members 33, 34, and 35 provide desired rigidity to the assembly 30. Although three cross members 33, 34, and 35 are shown in FIG. 3, it will be appreciated that a greater or lesser number of such cross members 33, 34, and 35 may be provided if desired. The illustrated cross members 33, 34, and 35 are formed from closed channel structural members having a generally circular cross sectional shape. However, the cross members 33, 34, and 35 may be formed having any desired cross sectional shape and may, if desired, be from open channel structural members.

Figure 4:
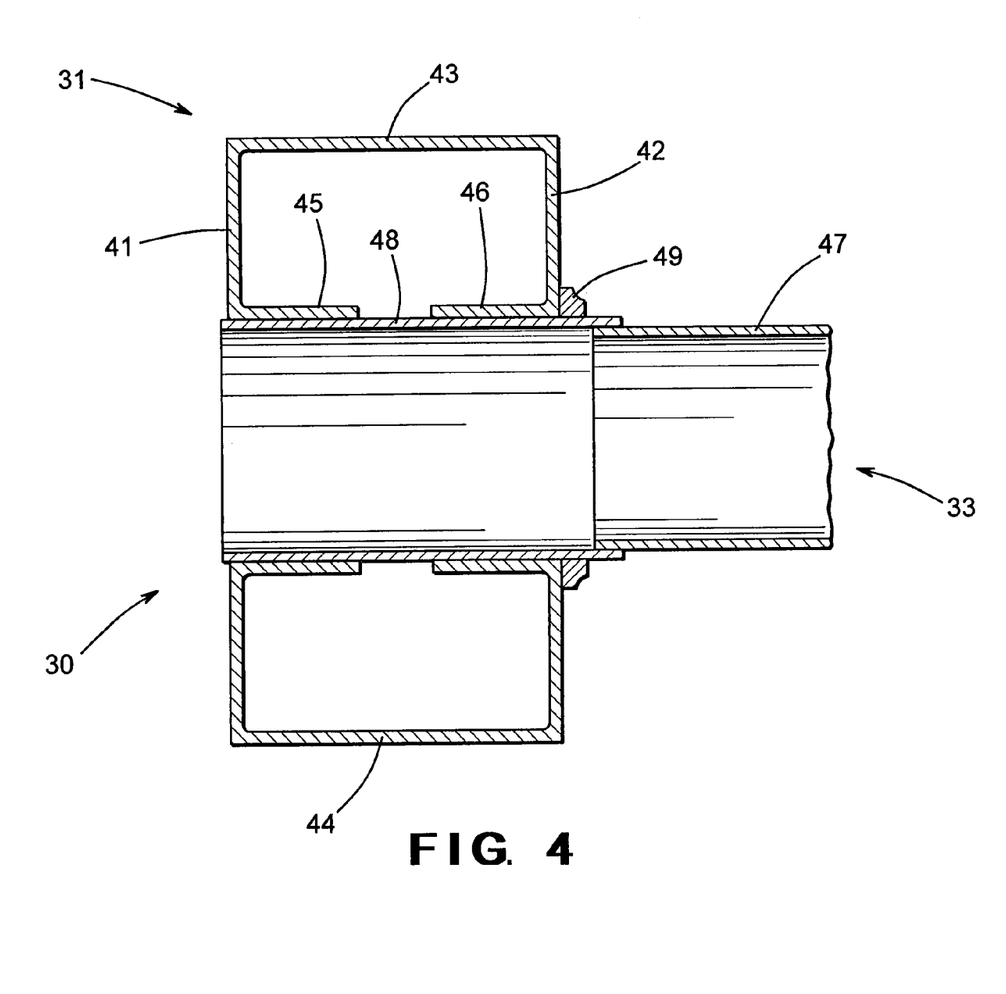
FIG. 4 is an enlarged sectional elevational view of portions of one of the side rails and one of the cross members taken along line 4—4 of FIG. 3.

Referring now to FIG. 4, there is illustrated an enlarged sectional elevational view of portions of one of the side rails 31 and one of the cross members 33 of the ladder frame assembly 30. The side rail 31 is a closed channel structural member that includes a pair of side walls 41 and 42 having upper and lower end walls 43 and 44 extending therebetween. A portion of the side wall 41 is deformed inwardly to provide an opening defining a first mounting projection 45. Similarly, a portion of the side wall 42 is deformed inwardly to provide an opening defining a second mounting projection 46. In the illustrated embodiment, the mounting projections 45 and 46 are both generally hollow and cylindrical in shape, corresponding to the generally cylindrical shape of the end of the cross member 33. However, it will be appreciated that the mounting projections 45 and 46 and the end of the cross member 33 may be formed having any desired shapes. The other side rail 32 is formed in a similar manner (although such is not required). As will be explained in greater detail below, the mounting projections 45 and 46 are sized to receive one end of the cross member 33 therein to form a joint between the cross member 33 and the side rail 31. As discussed above, this invention can be used to form any type of structural member for use in any type of vehicle frame assembly 30.

The illustrated cross member 33 (which is intended to be representative of any or all of the cross members 33, 34, and 35) is a multiple piece structure, including a central portion 47 having a pair of end portions 48 (only one is illustrated) secured thereto. In the illustrated embodiment, the central portion 47 is relatively long in comparison with the lengths of the end portions 48. For example, the illustrated central portion 47 of the cross member 33 extends most of the length thereof between the two side rails 31 and 32. However, this invention contemplates that the central portion 47 and each of the end portions 48 of the cross member 33 can have any desired relative lengths. The central portion 47 of the cross member 33 is preferably formed from a first metallic material, while the end portions 48 are preferably both formed from a second metallic material. Also, it is preferable that the end portions 48 of the cross member 33 are formed from the same metallic material as the respective side rails 31 and 32 to which they are secured. For example, if the side rails 31 and 32 of vehicle frame assembly 30 are formed from steel, then the end portions 48 of the cross member 33 can also be formed from steel, while the central portion 47 of the cross member 33 can be formed from aluminum. However, it will be appreciated that the side rails 31 and 32, the central portion 47 of the cross member 33, and each of the end portions 48 of the cross member can be formed from any desired material or materials. The end portions 48 of the cross member 33 can be secured to the ends of the central portion 47 by any desired process. For example, a magnetic pulse welding process can be used to secure the end portions 48 to the central portion 47 to form the cross member 33. This can be accomplished in the same manner as described above.

In the embodiment illustrated in FIG. 4, the length of the end portion 48 is greater than the width of the side rail 31 (i.e., the distance between the side walls 41 and 42). Thus, both ends of the end portion 48 extend through and are disposed adjacent to the side walls 41 and 42 of the side rail 31. The end portion 48 (and, therefore, the cross member 33) can be secured to the side walls 41 and 42 of the side rail 31 by any desired process. For example, the same magnetic pulse welding process described above can be used to secure the ends of the end portion 48 of the cross member 33 to the mounting portions 45 and 46 of the side rail 31. Alternatively, a conventional welding process can be used to secure the ends of the end portion 48 of the cross member 33 to the mounting portions 45 and 46 of the side rail 31.

If desired, a reinforcing and positioning collar 49 can be secured to the end portion 48 of the cross member 33 before the end portion 48 is secured to the side rail 31. The illustrated reinforcing and positioning collar 49 is generally annular in shape, extending completely about the end portion 48 of the cross member 33. However, the reinforcing and positioning collar 49 can be formed having any desired shape. The reinforcing and positioning collar 49 can be secured to the end portion 48 of the cross member 31 by any desired process. For example, the same magnetic pulse welding process described above can be used to secure the reinforcing and positioning collar 49 to the end portion 48 of the cross member 33. Alternatively, a conventional welding process can be used to secure the reinforcing and positioning collar 49 to the end portion 48 of the cross member 33. The reinforcing and positioning collar 49 provides a positive stop when inserting the end portion 48 of the cross member 31 through the side rail 31 for securement thereto. Thus, the reinforcing and positioning collar 49 provides a quick and easy mechanism for precisely positioning the cross member 33 relative to the side rail 31 prior to securement in the manner described above. The reinforcing and positioning collar 49 also provides lateral support of the side rail 31 by the cross member 33. The reinforcing and positioning collar 49 can, if desired, be secured directly to the side wall 42 of the side rail 31 by any desired process, such as by a conventional welding process.

Figure 5:
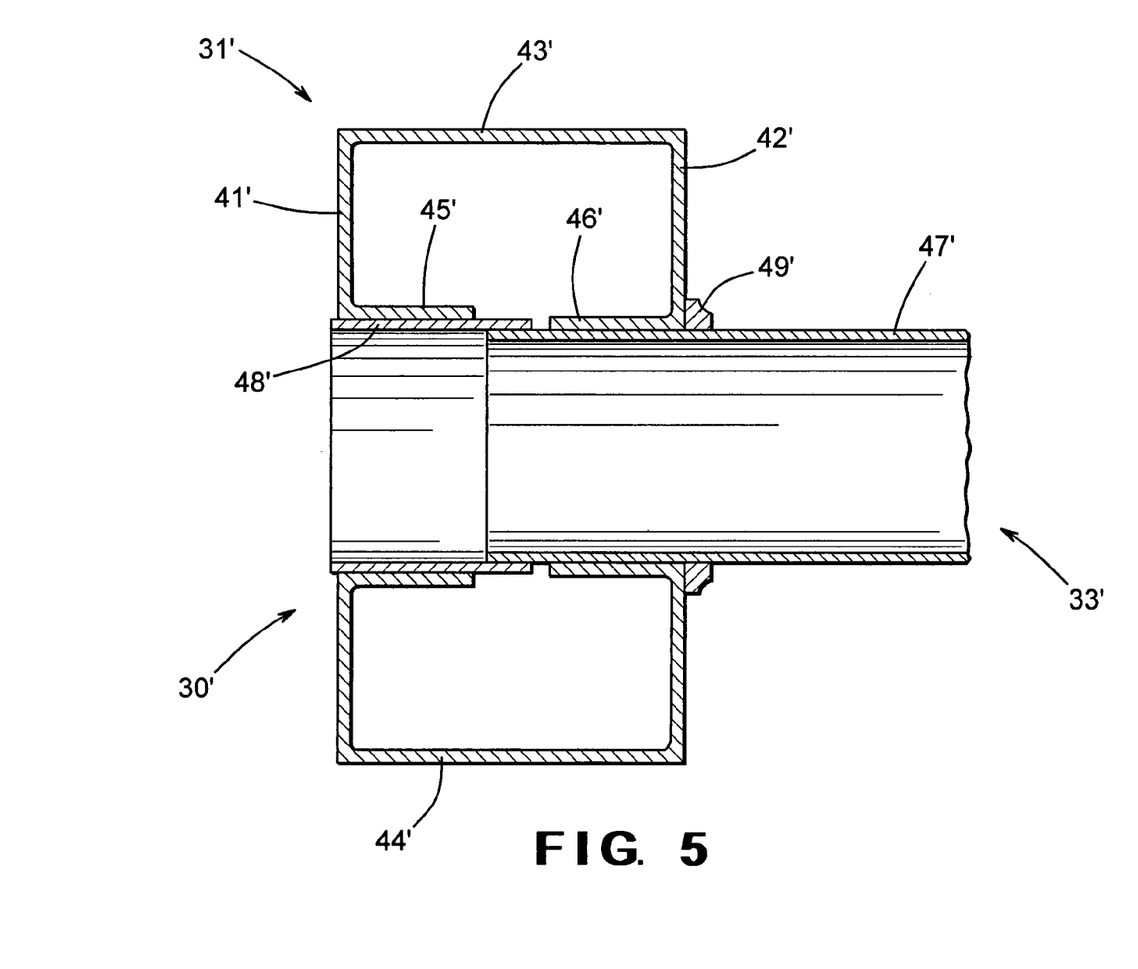
FIG. 5 is an enlarged sectional elevational view similar to FIG. 4 showing a third embodiment of one of the side rails and one of the cross members.

Referring now to FIG. 5, there is illustrated an enlarged sectional elevational view of a further embodiment of a portion of a vehicle frame assembly, indicated generally at 30', including a side rail 31' and a cross member 33'. The side rail 31' and the cross member 33' are, in large measure, similar to the side rail 31 and the cross member 33 described above in connection with FIGS. 3 and 4, and like reference numbers are used to indicate similar structures. In the embodiment illustrated in FIG. 5, however, the length of the end portion 48' is less than the width of the side rail 31' (i.e., the distance between the side walls 41' and 42'). Thus, only one end of the end portion 48' extends through and is disposed adjacent to the side wall 41' of the side rail 31'. The one end of the end portion 48' can be secured to the side wall 42' of the side rail 31' by any desired process, such as by a conventional welding process.

If desired, a reinforcing and positioning collar 49' can be secured to the end of the cross member 33' before the end portion 48' is secured to the side rail 31'. The illustrated reinforcing and positioning collar 49' is generally annular in shape, extending completely about the end of the cross member 33'. However, the reinforcing and positioning collar 49' can be formed having any desired shape. The reinforcing and positioning collar 49' can be secured to the end of the cross member 31' by any desired process. For example, the same magnetic pulse welding process described above can be used to secure the reinforcing and positioning collar 49' to the end of the cross member 33'. The reinforcing and positioning collar 49' provides a positive stop when inserting the end portion 48' of the cross member 31' through the side rail 31' for securement thereto. Thus, the reinforcing and positioning collar 49' provides a quick and easy mechanism for precisely positioning the cross member 33' relative to the side rail 31' prior to securement in the manner described above. The reinforcing and positioning collar 49' also provides lateral support of the side rail 31' by the cross member 33'. The reinforcing and positioning collar 49' can, if desired, be secured directly to the side wall 42' of the side rail 31' by any desired process.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle frame assembly comprising:
   a cross member including a body portion having an end portion magnetically pulse welded thereto, said body portion being formed from a first metallic material and said end portion being formed from a second metallic material that is different from said first metallic material; and
   a pair of side rails, said end portion and said body portion of said cross member being welded to said pair of side rails to form a vehicle frame assembly.

2. The vehicle frame assembly defined in claim 1 wherein said cross member includes a body portion having first and second end portions magnetically pulse welded thereto, said body portion being formed from said first metallic material and said end portions being formed from said second metallic material.

3. The vehicle frame assembly defined in claim 2 wherein each of said pair of side rails has a mounting projection formed thereon, and wherein said end portions of said cross member are respectively secured to said mounting portions.

4. The vehicle frame assembly defined in claim 2 wherein said pair of side rails are welded to said end portions of said first structural member to form the vehicle frame assembly.

5. The vehicle frame assembly defined in claim 1 wherein one of said pair of side rails has a mounting projection formed thereon, and wherein said end portion of said cross member is secured to said mounting portion.

6. The vehicle frame assembly defined in claim 1 wherein said end portion of said cross member is secured to one of said pair of side rails by magnetic pulse welding.

7. A vehicle frame assembly comprising:
   a first structural member including a body portion having an end portion magnetically pulse welded thereto, said body portion being formed from a first material and said end portion being formed from a second material that is different from said first material; and
   a plurality of second structural members, said first structural member and said plurality of second structural members being secured together to form a vehicle frame assembly, wherein a collar is secured to said end portion of said first structural member, wherein said collar is secured to one of said plurality of second structural members.

8. The vehicle frame assembly defined in claim 7 wherein said body portion of said first structural member is secured to one of said plurality of second structural members by magnetic pulse welding, and wherein said end portion of said first structural member is secured to said one of said plurality of second structural members by magnetic pulse welding.

9. A vehicle frame assembly comprising:
   a first structural member including a body portion having an end portion magnetically pulse welded thereto, said body portion being formed from a first material and said end portion being formed from a second material that is different from said first material; and a plurality of second structural members, said first structural member and said plurality of second structural members being secured together to form a vehicle frame assembly; wherein one of said plurality of second structural members has a mounting projection formed thereon and said end portion of said first structural member is secured to said mounting portion, and wherein either (1) said one of said second structural members is a C-shaped channel member and said mounting portion includes a deformation extending inwardly through a central web portion of said one of said second structural members, (2) said one of said second structural members is a closed channel member and said mounting portion includes a pair of deformations extending inwardly through respective opposing sides of said one of said second structural members, or (3) said end portion is disposed within said mounting portion and extends throughout said mounting portion.

10. The vehicle frame assembly defined in claim 9 wherein said one of said second structural members is a C-shaped channel member and said mounting portion includes a deformation extending inwardly through a central web portion of said one of said second structural members.

11. The vehicle frame assembly defined in claim 9 wherein said one of said second structural members is a closed channel member and said mounting portion includes a pair of deformations extending inwardly through respective opposing sides of said one of said second structural members.

12. The vehicle frame assembly defined in claim 9 wherein said end portion is disposed within said mounting portion and extends throughout said mounting portion.

13. A vehicle frame assembly comprising:
a first structural member including a body portion having an end portion magnetically pulse welded thereto, said body portion being formed from a first metallic material and said end portion being formed from a second metallic material that is different from said first metallic material; and
a plurality of second structural members, said end portion of said first structural member and said plurality of second structural members being welded together to form a vehicle frame assembly, one of said plurality of second structural members having a mounting projection formed thereon, said end portion of said first structural member being secured to said mounting portion, wherein either (1) said mounting portion surrounds said end portion, (2) said one of said plurality of second structural members includes a central web portion, and wherein said mounting portion is deformed inwardly from said central web portion, or said end portion is secured to said mounting portion by magnetic pulse welding to secure said first structural member to one of said plurality of second structural members.

14. The vehicle frame assembly defined in claim 13 wherein said mounting portion surrounds said end portion.

15. The vehicle frame assembly defined in claim 13 wherein said one of said plurality of second structural members includes a central web portion, and wherein said mounting portion is deformed inwardly from said central web portion.

16. The vehicle frame assembly defined in claim 13 wherein said end portion is secured to said mounting portion by magnetic pulse welding to secure said first structural member to one of said plurality of second structural members.

* * * * *